(12) United States Patent
Mazuir et al.

(10) Patent No.: US 11,820,285 B2
(45) Date of Patent: *Nov. 21, 2023

(54) LIGHTING SYSTEMS WITH ADJUSTABLE INTERIOR LIGHTING

(71) Applicant: Apple Inc., Cupertino, CA (US)

(72) Inventors: Clarisse Mazuir, San Jose, CA (US); Arthur Y. Zhang, San Jose, CA (US); Matthew E. Last, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,572

(22) Filed: Nov. 18, 2022

(65) Prior Publication Data
US 2023/0079840 A1 Mar. 16, 2023

Related U.S. Application Data

(63) Continuation of application No. 17/404,185, filed on Aug. 17, 2021, now Pat. No. 11,505,119, which is a continuation of application No. 16/671,051, filed on Oct. 31, 2019, now Pat. No. 11,097,658, which is a continuation of application No. 15/263,971, filed on Sep. 13, 2016, now Pat. No. 10,464,476.

(60) Provisional application No. 62/356,131, filed on Jun. 29, 2016.

(51) Int. Cl.
*B60Q 3/233* (2017.01)
*B60Q 3/60* (2017.01)
*B60Q 3/80* (2017.01)
*B60Q 3/217* (2017.01)
*B60Q 3/292* (2017.01)
*B60Q 3/54* (2017.01)

(52) U.S. Cl.
CPC ............. *B60Q 3/233* (2017.02); *B60Q 3/217* (2017.02); *B60Q 3/292* (2017.02); *B60Q 3/60* (2017.02); *B60Q 3/80* (2017.02); *B60Q 3/54* (2017.02)

(58) Field of Classification Search
CPC ...... B60Q 3/233; B60Q 3/60; B60Q 2500/10; B60Q 3/217; B60Q 3/292
See application file for complete search history.

(56) References Cited

U.S. PATENT DOCUMENTS

| | | | |
|---|---|---|---|
| 5,771,810 A | 6/1998 | Wolcott |
| 6,446,375 B1 | 9/2002 | Davis |
| 7,084,859 B1 | 8/2006 | Pryor |
| 7,612,933 B2 | 11/2009 | Djordjev |

(Continued)

*Primary Examiner* — Karabi Guharay
(74) *Attorney, Agent, or Firm* — Treyz Law Group, P.C.; G. Victor Treyz; Kendall P. Woodruff

(57) ABSTRACT

Lighting may be provided using light sources such as lighting systems with arrays of light-emitting diodes. A lighting system may be integrated into interior portions of a system. The interior portions may be illuminated using lighting systems to provide ambient light, to provide custom surface textures and other decorative patterns, to provide icons, text, and other information, and to provide other illuminated regions. Illuminated regions may overlap sensors such as capacitive touch sensors, force sensors, and other sensors. The light-emitting diodes in a lighting system may supply light that passes through openings in a cover layer. The layer may be formed from fabric, leather, or other materials. Lens structures may guide light through the openings.

20 Claims, 17 Drawing Sheets

(56) References Cited

U.S. PATENT DOCUMENTS

| | | |
|---|---|---|
| 8,000,091 B2 | 8/2011 | Shinn et al. |
| 8,031,168 B2 | 10/2011 | Feenstra et al. |
| 8,333,492 B2 | 12/2012 | Dingman et al. |
| 8,344,870 B2 | 1/2013 | Evans et al. |
| 8,625,060 B2 | 1/2014 | Wang et al. |
| 8,730,154 B2 | 5/2014 | Dean et al. |
| 8,780,437 B1 | 7/2014 | Lo et al. |
| 8,836,494 B2 | 9/2014 | Reuschel et al. |
| 11,097,658 B1 * | 8/2021 | Mazuir .................... B60Q 3/60 |
| 11,505,119 B2 * | 11/2022 | Mazuir .................. B60Q 3/745 |
| 2004/0017687 A1 | 1/2004 | Misaras |
| 2007/0049147 A1 | 3/2007 | Hill et al. |
| 2008/0189053 A1 | 8/2008 | Breed et al. |
| 2008/0211652 A1 | 9/2008 | Cope et al. |
| 2012/0001842 A1 | 1/2012 | Stellbrink |
| 2012/0081777 A1 | 4/2012 | Heikenfeld et al. |
| 2013/0301287 A1 | 11/2013 | Schlemmer |
| 2014/0211498 A1 | 7/2014 | Cannon et al. |
| 2014/0252813 A1 | 9/2014 | Lee et al. |
| 2015/0168644 A1 | 6/2015 | Meyers et al. |
| 2015/0274068 A1 | 10/2015 | Falconi |
| 2016/0242251 A1 | 8/2016 | Newton et al. |
| 2017/0050561 A1 | 2/2017 | Lickfelt |
| 2019/0202290 A1 | 7/2019 | Havemann |

\* cited by examiner

LIGHTING SYSTEMS WITH ADJUSTABLE INTERIOR LIGHTING

The application is a continuation of U.S. patent application Ser. No. 17/404,185, filed Aug. 17, 2021, which is a continuation of U.S. patent application Ser. No. 16/671,051, filed Oct. 31, 2019, now U.S. Pat. No. 11,097,658, which is a continuation of U.S. patent application Ser. No. 15/263,971, filed Sep. 13, 2016, now U.S. Pat. No. 10,464,476, which claims the benefit of provisional patent application No. 62/356,131, filed Jun. 29, 2016, all of which are hereby incorporated by reference herein in their entireties.

FIELD

This relates generally to light-emitting devices, and, more particularly, to customizable lighting systems.

BACKGROUND

Equipment such as embedded systems may sometimes include light-emitting components that provide aesthetic lighting and informative visual output such as display and status indicator light output. Lighting systems for equipment may sometimes be insufficiently flexible, may produce output that is insufficiently informative and that is not aesthetically appealing, or may be unable to respond to varying input conditions.

SUMMARY

A lighting system may have light-emitting diodes that supply illumination. The light-emitting diodes may be formed in a display layer that contains an array of organic light-emitting diodes or a display layer formed from an array of crystalline semiconductor dies. Light-emitting diodes may also be used to provide illumination that is distributed using fibers or other light guides. In some configurations, lighting systems may contain stand-alone light sources such as light-emitting diodes that are coupled to fibers or larger area light-emitting diodes formed from thin-film circuitry on a substrate.

A lighting system may be integrated into a seat, a door panel, a dashboard, or other interior portions of a system such as a vehicle. These interior portions of the system may be illuminated with light from a lighting system.

Illumination from a lighting system may serve as provide ambient light, may create a custom surface texture or other decorative pattern on a seat or other interior surface, may include icons, text, and other information, and may include custom gauges. Illuminated regions may overlap sensors such as capacitive touch sensors, force sensors, and other sensors. The light-emitting diodes in a lighting system may supply light that passes through openings in a cover layer. The layer may be formed from fabric, leather, or other materials. Lens structures may guide light through the openings.

Further features will be more apparent from the accompanying drawings and the following detailed description.

DETAILED DESCRIPTION

Figure 1:
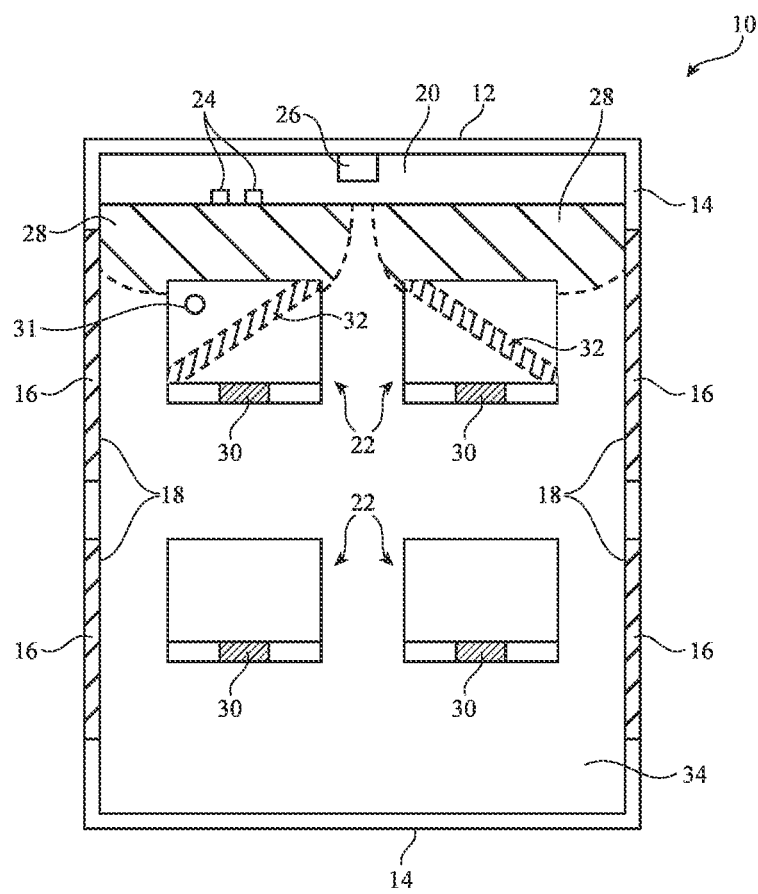
FIG. 1 is a diagram of an illustrative system that may have lighting in accordance with an embodiment.

An illustrative system of the type that may be provided with illumination is shown in FIG. 1. System 10 may be a vehicle, a kiosk, a room in an office or other building, or other environment that includes lighting. Illustrative configurations in which system 10 is a vehicle may sometimes be described herein as an example.

As shown in FIG. 1, system 10 may include windows such as front window 12, rear window 14, and side windows that are mounted in body 14. Body 14 may have doors 16.

Surfaces 18 of doors 16 may sometimes be referred to as door panels and face the interior of body 14. Dashboard 20 may be located in front of seats 22. Buttons, dials, and other components 24 may be provided on dashboard 20 and elsewhere in system 10 and may be provided with illumination from a lighting system. A camera such as camera 26 and other input-output components may be provided in system 10 and may monitor movements of users (occupants) of system 10. Footwells 28 may be covered with carpeting or other suitable material. Seats 22 may include pressure sensors such as pressure sensor 31 to measure pressure (weight) due to the presence of a driver, passenger, or other occupants (users) in seats 22. Headrests 30 may be mounted on the rear portions of seats 22. Seatbelts 32 may be used to restrain occupants of system 10 in seats 22.

Illumination such as user-customized lighting and other lighting may be provided on the interior and/or exterior surfaces of system 10. As examples, lighting may be provided on the interior surface of doors 18 (e.g., on door panels), in footwells 28 (e.g., in the carpet or other material in footwells 28), on dashboard 20 (e.g., locations associated with components 24 and/or other portions of dashboard 20), on horizontal areas (seating surfaces) of seats 22, on the front of rear of seatbacks in seats 22, on the front or rear of headrests 30, on a headliner (e.g., on the interior of a vehicle roof), on interior surfaces of A pillars, B pillars, C pillars, or other structural components), on seatbelts 32, on a steering wheel, on an arm rest or console between seats 22, on an arm rest on doors 16, on mirrors, on rear seat footwells or other portions of floor 34 of system 10, or any other interior and/or exterior surfaces of system 10.

Figure 2:
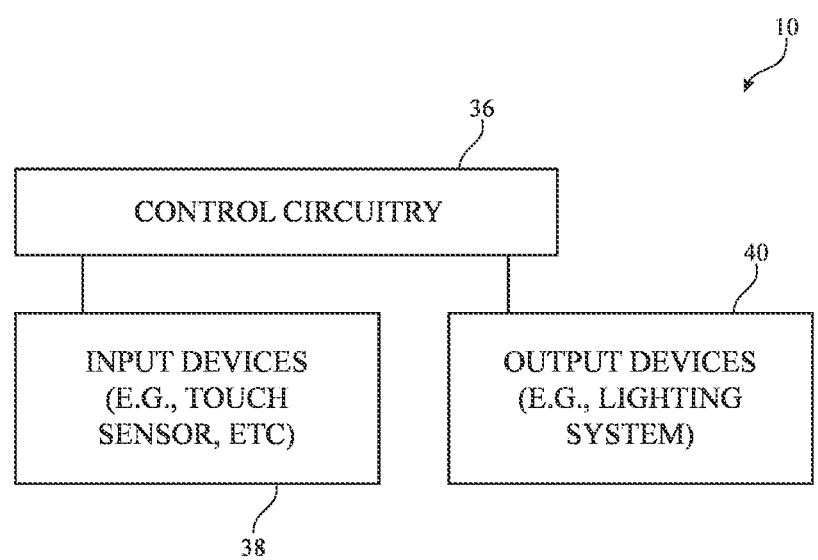
FIG. 2 is a schematic diagram of an illustrative system with lighting in accordance with an embodiment.

FIG. 2 is a schematic diagram of an illustrative system with lighting. As shown in FIG. 2, system 10 may include control circuitry 36. Control circuitry 36 may include one or more microprocessors, application-specific integrated circuits, digital signal processors, microcontrollers, or other processing circuitry. Control circuitry 36 may also include storage such as volatile and non-volatile memory, solid state drives, hard disk drives, and removable storage media. During operation of device 10, control circuitry 36 may process data and take suitable actions in response. Data may be gathered from circuitry 36 (e.g., clock information, status information on the current operating state of system 10, etc.) and may be gathered from input devices 38. Based on the data that is processed by control circuitry 36, control circuitry 36 may use electrical components such as output devices 40 to take actions such as displaying visual output for a user of system 10 with a lighting system in devices 40, presenting audio output to the user, adjusting an electromechanical actuator (e.g., to adjust steering, braking, etc.), controlling a motor (e.g., to position a seat), etc.

Input devices 38 may include force sensors. For example, devices 38 may include force sensors based on strain gauges, force sensors based on piezoelectric materials, force sensors based on compressible resistive foam, capacitive force sensors (e.g., force sensors based on collapsible foam, fabric with conductive strands that serve as capacitive electrodes, or other capacitive force sensor structures), or other force sensor structures that detect applied force such as applied force from the fingers (or other body part) of a user. Devices 38 may include one or more proximity sensors that detect when a user's fingers (or other body part) or other external object is in the vicinity of the proximity sensor. The proximity sensors may include light-based proximity sensors formed using light emitters (e.g., infrared light-emitting diodes) and corresponding light detectors (e.g., infrared light detectors that detect infrared light from the infrared light-emitting diodes that have been reflected off of nearby objects), may include capacitive proximity sensors (e.g., sensors with capacitive proximity sensor electrodes that make capacitance measurements to detect when objects are nearby), may be acoustic proximity sensors, and/or may be other types of proximity sensors. Input devices 38 may also include touch sensors. The touch sensors may be based on acoustic touch technology, light-based touch technology, resistive touch, force-based touch, or other touch technologies. As an example, the touch sensor(s) may be capacitive touch sensors having capacitive touch sensor electrodes such as electrodes formed from strands of conductive material in a fabric, electrodes formed from strips of metal or other conductive material on dielectric substrates, or electrodes formed from conductive pads with other configurations. Input devices 38 may also include environmental sensors (e.g., gas sensors, humidity sensors, temperature sensors, particulate sensors, etc.), keyboards and other devices with one or more keys or other buttons, accelerometers, magnetic sensors, compasses, pressure sensors (e.g., air pressure sensors and/or force sensors), touch sensors in displays, microphones to gather voice commands and other audio input, and other input components.

Output devices 40 may include devices for presenting audio output (e.g., speakers, tone generators, etc.), may include vibrators and other haptic devices, and other components for presenting information to a user. Output devices 40 may also include lighting systems. For example, devices 40 may include displays or other structures having arrays of pixels for presenting images to a user. Each pixel in this type of device may have an associated light-emitting diode. Devices 40 may also have stand-alone light emitting components such as single-element and multi-element status indicator lights and other light sources. Light sources for arrays of pixels and for stand-alone light emitting components may be formed from organic light-emitting diodes (e.g., diodes formed from thin-film circuitry on a substrate) and/or may be light-emitting diodes formed from crystalline semiconductor dies (sometimes referred to as micro-LEDs or micro-light-emitting diodes). If desired, light sources for lighting systems in devices 40 may include lamps, electroluminescent panels, and other components that generate light.

Figure 3:
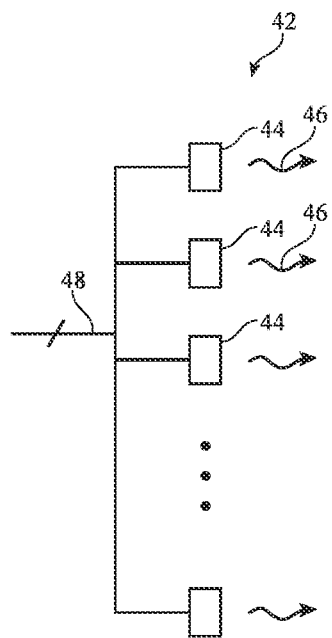
FIG. 3 is a diagram showing how individually adjustable light-emitting components such as light-emitting diodes may emit light in accordance with an embodiment.

During operation, control circuitry 36 may generate control signals that direct a lighting system to generate output light (e.g., images, ambient lighting, lighting to adjust the aesthetic appearance of a structure in system 10 by illuminating an interior surface of system 10 with a decorative pattern, virtual speedometers and other vehicle gauges, media playback information panels and other information regions, etc.). An illustrative lighting system that has multiple light emitters is shown in FIG. 3. As shown in FIG. 3, lighting system 42 may have light emitters such as light-emitting diodes 44 that emit light 46. Control circuitry 36 (FIG. 2) may issue control signals on paths 48 that determine the amount of light 46 that is emitted by each light-emitting diode 44. Light-emitting diodes 44 may be stand-alone elements (e.g., light emitters that are spatially isolated from other light emitters and/or that are adjusted independently from nearby light emitters) or may form part of a one-dimensional or two-dimensional array of light-emitting diodes. A one-dimensional array of light-emitting diodes may, as an example, form part of a multi-element status indicator (e.g., a gauge in which a progressively increasing number of elements are turned on when a measured value is increasing). A two-dimensional array of light-emitting diodes 44 may form a display (e.g., a structure for displaying static and/or moving images to a user). Lighting systems with individual light-emitting diodes 44, lighting systems with one-dimensional arrays of light-emitting diodes, and lighting systems with two-dimensional arrays of light-emitting diodes may be used to supply ambient lighting, decorative lighting (e.g., illuminated trim, surfaces with aesthetically pleasing decorative patterns), or other types of illumination.

Figure 4:
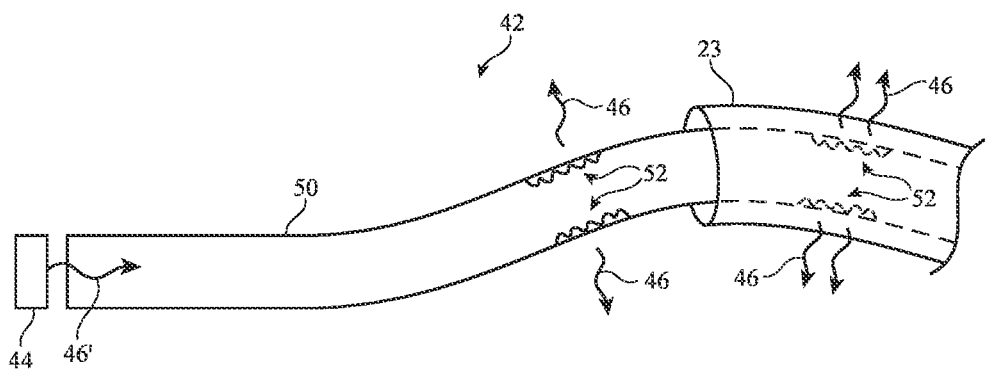
FIG. 4 is a diagram of an illustrative lighting system showing how a fiber or other light guide may distribute illumination in accordance with an embodiment.

If desired, lighting systems such as lighting system 42 of FIG. 4 may contain light guides that guide light internally in accordance with the principle of total internal reflection. In the example of FIG. 4, light-emitting diode 44 is emitting light 46' into light guide 50. Light guide 50 may be a fiber, a molded plastic structure, or other light guiding structure. If desired, light guides such as light guide 50 may have one or more light extraction regions such as regions 52. The light extraction regions of light guide 50 may be characterized by roughened surfaces, protrusions such as bumps or ridges, recesses such as pits or grooves, or other light extraction features. In the presence of a light extraction region such as light extraction regions 52, light 46' from the interior of light guide 50 may be scattered out of light guide 50 as illumination (light) 46. Fibers and other elongated light guide structures may be incorporated into piping in seat cushions in seats 22 (see, e.g., illustrative piping 23), into trim on the interior surfaces of system 10, or in other portions of system 10.

Figure 5:
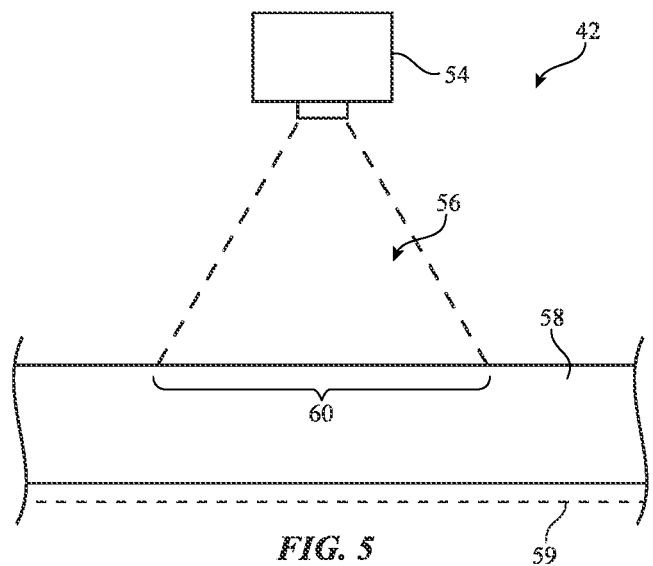
FIG. 5 is a side view of an illustrative light projection system such as an image projector of the type that may be used to provide lighting in accordance with an embodiment.

As shown in FIG. 5, lighting system 42 may include a light projector such as light projector 54. Light projector 54 may produce monochrome or multicolor output in the form of an image (e.g., a projected color image or a projected monochrome image), in the form of a single block of light (colored, white, etc.), or in the form of a decorative pattern (e.g., alternating black and white strips, etc.). Projector 54 may display light output in region 60 on surface 56 of structure 58. Structure 58 may be a layer of plastic, a layer of fabric, metal, natural materials such as leather or wood, paper, other materials, or combinations of these materials. For example, structure 58 may be a covering layer formed from fabric, vinyl or other plastic, wood, or leather on dashboard 20 or other interior surface of system 10 and region 60 may be provided with a decorative light pattern, an image containing information on the operational status of system 10, an image containing information on environmental parameters associated with the operating environment for system 10 (e.g., temperature, speed, etc.), or other illumination.

In addition to using projector 54 or instead of using projector 54 to modify the appearance of structure 58, a reflective display device may be incorporated into structure 58 and/or overlapped by structure 58. For example, a reflective display device such as reflective display device (reflective display) 59 may be located under structure 58 in configurations in which structure 58 is a layer of fabric, a layer of plastic, a layer of metal, a leather layer, or a structure formed from other materials. In this type of arrangement, structure 58 may be a light-transmitting structure such as a light-transmitting layer with perforations or other openings, translucent portions, clear portions, openings filled with clear plastic, or other light-transmitting layer.

Reflective display device 59 may have an array of pixels suitable for producing images (text, graphics, video, etc.) or may have one or more larger independently adjustable areas for changing the overall appearance of structure 58 (e.g., without producing images formed from arrays of pixels). The larger areas may be rectangular, circular, or other shapes, may have outlines in the shapes of icons or text, or may have other suitable shapes.

Reflective display device 59 may be an electronic ink device, a microelectromechanical systems (MEMs) device, an electrowetting display device, an electrofluidic display device, a reflective liquid crystal display device without a backlight, or other light modulating device that is illuminated with ambient light (or light from projector 54) rather than emitting light or modulating backlight from a backlight unit.

The state of reflective display device 59 and, if desired, the output of projector 54, may be adjusted to dynamically control the outward appearance of surface 56 of structure 58. Consider, as an example, a scenario in which structure 58 is a layer of material with openings (e.g., fabric, perforated metal, leather, or plastic, etc.), a layer of material with translucent areas, or other light-transmitting layer that overlaps reflective display device 59. When reflective display device 59 has a first state (e.g., a low reflectance state) and/or when projector 54 is not emitting light, the appearance of structure 58 may be relatively dark and natural looking (i.e., structure 58 may have its natural appearance, which may match the appearance of similar structures in system 10 that are not associated with reflective display devices). When the reflective display has a second state (e.g., a high reflectance state) and/or when projector 54 is emitting light, the appearance of structure 58 may be lighter, may be sparking or shiny, may be characterized by a recognizable pattern of light and dark areas, may have a different visual texture, etc. or may otherwise be visually distinguishable from the appearance of structure 58 when reflective display device 59 has its first state. The output of projector 54 and/or the state of reflective display device 59 in layer 58 may be adjusted whenever it is desired to change the color, texture, pattern of light and dark areas, and other visual attributes of structure 58.

Reflective display devices may consume relatively low amounts of power, particularly when refreshed infrequently, and may therefore be suitable for use in applications in which low power consumption is desired and in which the appearance of surface 56 is not changed frequently. For example, it may be desirable to include reflective display device 59 under portions of structure 58 in arrangements in which structure 58 forms an interior structure in a system such as a vehicle (e.g., an interior panel in a vehicle, a portion of a seat in a vehicle, a portion of a headrest or dashboard in a vehicle, a portion of a floor mat, a trim structure, or other interior vehicle component, or an interior vehicle structures. Reflective display device 59 may be used to provide a customized visual appearance to structure 58 (e.g., adjustable visual texture, adjustable color, etc.) and may be used to display dynamic patterns to structure 58 that form indicators, icons, and other visual patterns (e.g., an indicator that does not change frequently such as a cup holder position indicator, button location indicator, a warning light indicator, etc.).

Figure 6:
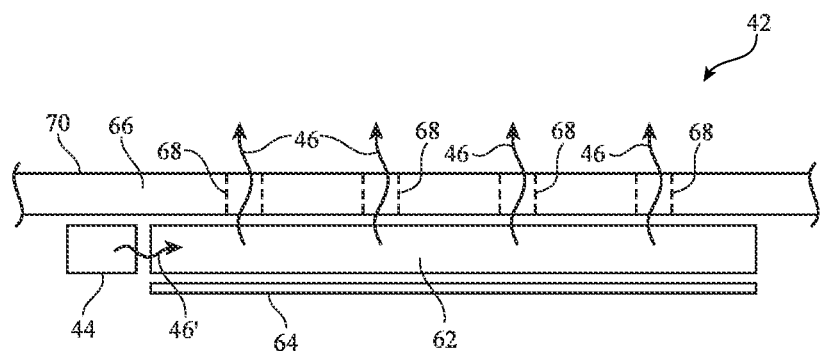
FIG. 6 is a cross-sectional side view of an illustrative lighting system in which a light guide plate is used in providing illumination in accordance with an embodiment.

Layer 58 and the reflective display device that is overlapped by layer 58 may be illuminated with light from the interior of system 10 that is produced by projector 54 (e.g., colored light, white light, patterned light, images, etc.) and/or ambient light from the interior of system 10 (e.g., daylight that has entered the interior of a vehicle through vehicle windows, artificial ambient lighting in the interior of a vehicle, or other ambient light in system 10). FIG. 6 is a cross-sectional side view of an illustrative lighting system in which light is distributed using a thin light guide structure such as light guide layer 62. Light guide layer 62 may be a light guide layer formed from a molded plastic light guide plate or a flexible sheet of polymer (sometimes referred to as a light guide film). A light source formed from one or more light-emitting diodes such as light-emitting diode 44 may emit light 46' into an edge of light guide layer 62. A light extraction region may be formed in light guide layer 62 by providing the lower surface of light guide layer 62 and/or other portions of light guide layer 62 with protrusions such as ridges or bumps, recesses such as grooves or pits, or other light extraction features that help scatter light 46' out of light guide layer 62 to serve as illumination 46. If desired, a reflective layer of white plastic or other reflector structure may be placed under light guide plate 62, as illustrated by reflector 64. Reflector 64 may help reflect light that has scattered out of light guide layer 62 towards reflector 64 (i.e., in the downward direction in the orientation of FIG. 4) back through light guide layer 62 (i.e., upward in the orientation of FIG. 6).

Lighting systems in device 10 such as illustrative lighting system 42 of FIG. 6 may include covering structures such as layer 66. Layer 66 may be a covering layer that includes one more layers of material (e.g., leather, wood, natural-fiber fabric such as wool or cotton fabric, or other natural materials, plastic, glass, ceramic, metal, synthetic fiber fabric, fabric formed from multiple materials, fiber composite materials such as carbon fiber composites, etc.). If desired, layer 66 may have openings such as openings 68. Openings 68 may be microperforations (e.g., openings with diameters of 50 microns or less, 200 microns or less, 1-300 microns, or other small openings that are invisible to the naked eye during normal use), may be slots, may have shapes such as circular shapes, rectangular shapes, triangular shapes, and/or other shapes, or may have other suitable configurations. As shown in FIG. 6, openings 68 may allow light 46 from light guide layer 62 to pass (e.g., so that light 46 may be viewed by a user of system 42). Openings 68 may form an array of openings, may be patterned to form text, may have the shape of an icon or other symbol, may form an outline for a symbol, or may have any other suitable shape. In configurations in which openings 68 are relatively small, the appearance of surface 70 in the absence of illumination may primarily be dictated by the appearance of outer surface 70 of layer 66 (e.g., leather, fabric, plastic, metal, etc.) and internal light source structures such as light-emitting diode 44 and light guide layer 62 may be hidden from view. When it is desired to change the appearance of surface 70, lighting system 42 may be used to produce illumination 46.

Figure 7:
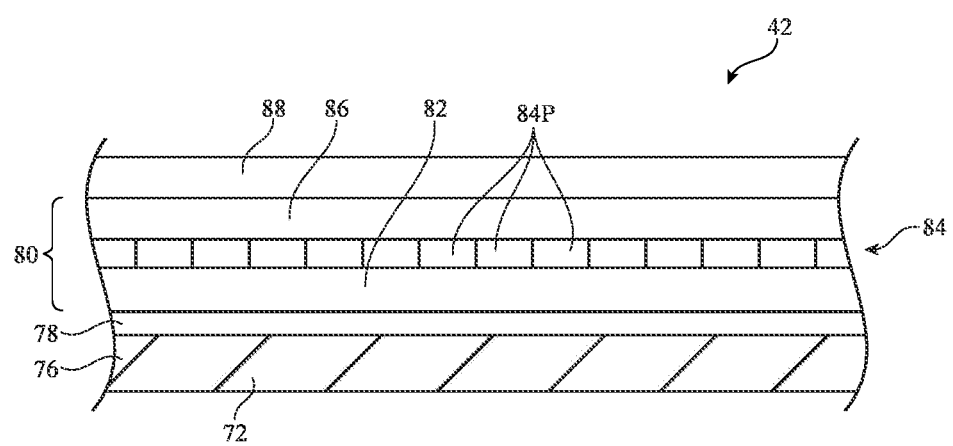
FIG. 7 is a cross-sectional side view of an illustrative lighting system in accordance with an embodiment.

In the illustrative configuration of FIG. 7, lighting system 42 has a display such as display (display layer) 80 that is supported by an inner support structure such as support structure 72. Support structure 72 may be metal (which may distribute and dissipate heat from light-emitting diodes in layer 80), plastic, or other suitable material and may be associated with an interior structure in system 10 (e.g., dashboard 20, doors 16, etc.). Display 80 may be attached to layer 72 using adhesive layer 78. Layer 78 may be, for example, a layer of pressure sensitive adhesive. Display 80 may be covered with a protective coating such as clear outer coating layer 88. Layer 88 may be, for example, a clear polymer layer.

Display 80 may have a light-emitting layer such as display layer 84. Layer 84 may have an array of pixels 84P (e.g., light-emitting diodes, backlit pixels in an electronic ink display or liquid crystal display, etc.). Encapsulation layer 86 may include moisture barrier structures to help prevent moisture from damaging pixels 84P. Substrate layer 82 in display 80 may be formed from a layer of flexible plastic or other substrate material. In general, any suitable display technology may be used in forming display 80. For example, display 80 may be an organic light-emitting diode display, a liquid crystal display that is backlit using a backlight unit having an array of light-emitting diodes arranged along the edge of a light guide layer such as layer 62 of FIG. 6, an electrophoretic display (sometimes referred to as electronic ink), an electrowetting display, a microelectromechanical systems (MEMs) display, an electrokinetic display, an electrofluidic display or other suitable type of display. Although illustrative lighting system 42 of FIG. 7 has a display layer (layer 84) that has an array of pixels 84P (e.g., a two-dimensional array of pixels for displaying images), layer 84 may, if desired, have light-emitting areas that are relatively large (e.g., a single stand-alone light emitting area of 1-100 cm×1-100 cm, less than 500×500 cm, more than 1 mm×1 mm, etc. or a group of two or more of these relatively larger light-emitting structures that are not sufficiently abundant and finely pitched to display images but that can serve as ambient lighting or part of a status indicator, etc.). The use of a light emitting layer in system 42 that includes a display layer such as layer 84 with pixels 84P is merely illustrative. If desired, lighting systems such as system 42 of FIG. 7 may be covered with covering structures such as illustrative layer 66 of FIG. 6.

Figure 8:
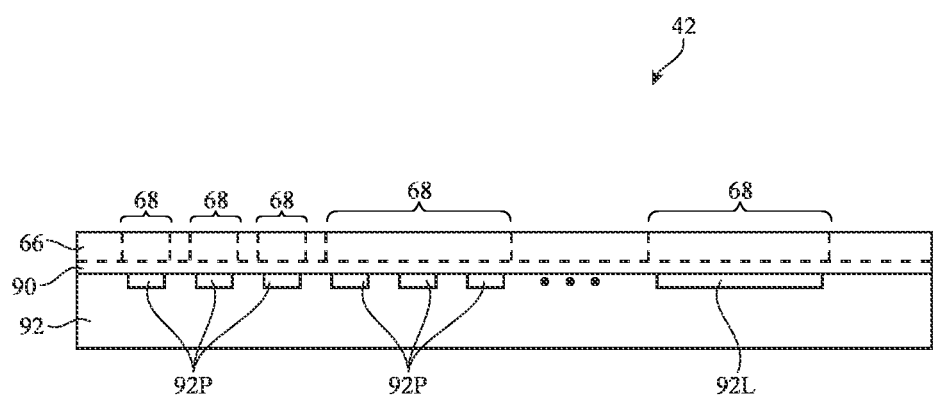
FIG. 8 is a cross-sectional side view of an illustrative lighting system that is covered with a layer having openings aligned with light-emitting components in the lighting system in accordance with an embodiment.

Illustrative lighting system 42 of FIG. 8 includes a sensor such as sensor 90. Sensor 90 may be a force sensor, a proximity sensor, a touch sensor, or other suitable sensor. Sensor 90 may be, as an example, a capacitive touch sensor formed from transparent capacitive touch sensor electrodes (e.g., indium tin oxide electrodes, electrodes of thin transparent metal, etc.) on a transparent polymer substrate or a fabric capacitive touch sensor formed from overlapping perpendicular conductive strands of material (e.g., warp strands that serve as drive lines and weft strands that serve as sense lines in a capacitive touch sensor electrode array). Sensor 90 may be interposed between display layer 84 and covering layer 66. Display layer 92 may include light-emitting diodes or other components that emit light. As an example, display layer 92 may include an array of pixels 92P (e.g., pixels containing respective organic light-emitting diodes or crystalline semiconductor light-emitting diode dies). Layer 66 may be formed from a fabric layer, leather layer, plastic layer, metal layer, wood layer, or other suitable covering material. If desired, sensor 90 may be a capacitive touch sensor that is formed from conductive strands of material that serve as electrodes in a layer of fabric (i.e., sensor 90 may be formed from the fabric of layer 66).

Openings 68 in layer 66 may each be aligned with a respective one of pixels 92P or may be sufficiently large to overlap multiple pixels 92P. Display layer 92 may, if desired, include larger light-emitting areas (e.g., larger area organic light-emitting diodes) such as light-emitting diode 92L that do not serve as pixels in a pixel array that displays images. Light-emitting areas such as these may also be aligned with openings 68. For example, one or more of openings 68 may overlap each larger-area diode 92L.

Figure 9:
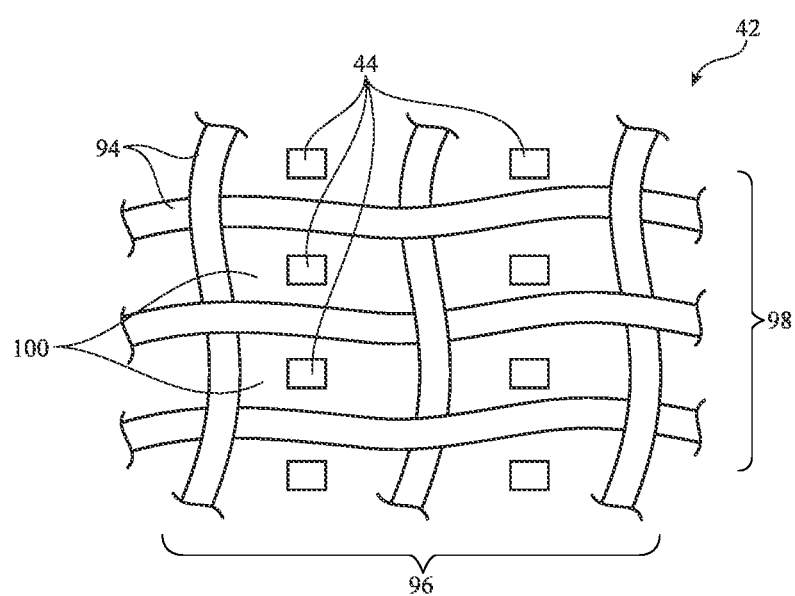
FIG. 9 is a top view of an illustrative lighting system that provides illumination through openings in fabric in accordance with an embodiment.

FIG. 9 is a top view of an interior surface in system 10 (e.g., the surface of dashboard 20, door panels 18, headrests 30, seats 22, or any other suitable surface of system 10) in an illustrative configuration in which the interior surface is covered with fabric 94. As shown in FIG. 9, lighting system 42 of FIG. 9 may have light-emitting diodes 44 that emit light through openings 100 in fabric 94. Fabric 94 may be knit, braided, woven, or may otherwise be formed from intertwined strands of material. The strands of material may include metal strands (e.g., wire), polymer strands, strands of natural material, strands of coated material (conductive or insulating), colored materials, and other suitable materials.

As an example, fabric 94 may be woven fabric having warp fibers 96 and weft fibers 98. Light-emitting diodes 44 may each be aligned with one or more openings in fabric 94 such as openings 100 and may be used to display images, to provide ambient lighting, to provide illumination for a status indicator, to provide lighting that creates a desired pattern on fabric 96, etc. If desired, some of warp strands 96 may be insulating and some of warp strands 96 may be conductive and serve as capacitive touch sensor electrodes. Some of weft strands 98 may be insulating and some of weft strands 98 may be conductive and serve as capacitive touch sensor electrodes. In this type of configuration, capacitive touch sensor 90 (FIG. 8) may be formed using a grid of conductive strands formed from the conductive warp and weft strands. Touch sensor circuitry in control circuitry 36 may be coupled to the touch sensor electrodes and may be used to gather touch input from a user's fingers (e.g., gesture input, etc.).

Figure 10:
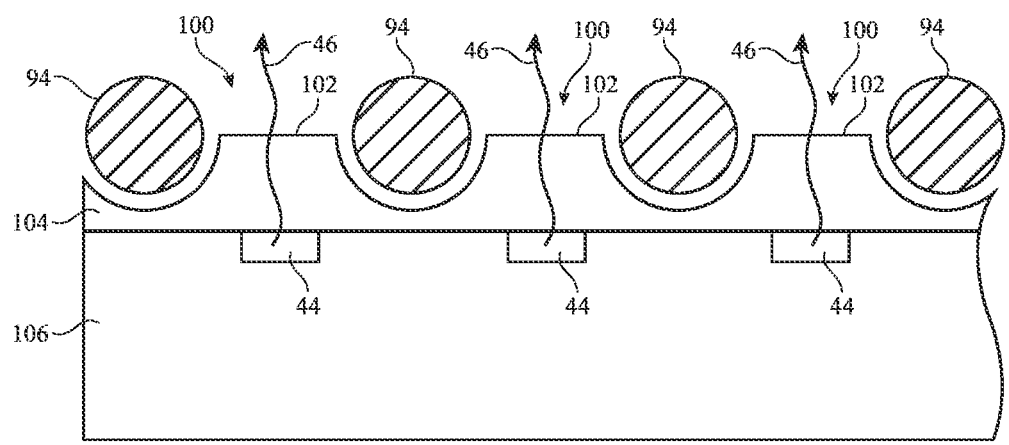
FIG. 10 is a cross-sectional side view of an illustrative lighting system with lens structures that guide illumination through openings in a covering layer such as a fabric covering layer in accordance with an embodiment.

FIG. 10 is a cross-sectional side view of an illustrative lighting system that has light-emitting diodes 44 that emit light 46 through openings 100 in fabric 94. Fabric 94 in FIG. 10 may be, for example, woven fabric of the type shown in FIG. 9. Lenses 102 may be formed from plastic layer 104 on layer 106. Layer 104 may be, for example, a layer of clear molded plastic that forms lens structures such as lenses 102 for helping to guide light 46 through openings 100 in fabric 94. Layer 106 may be a display layer (i.e., diodes 44 may be sufficiently dense to display images) or layer 106 may contain fewer light-emitting diodes 4. Light-emitting diodes 44 may be controlled independently or may be controlled in tandem. If desired, patterns of light-emitting diodes 44 may be illuminated to provide non-image illumination (e.g., ambient lighting, decorative patterns, etc.). Light-emitting diodes 44 may be formed from an array of organic light-emitting diodes on a substrate or light-emitting diodes 44 may be crystalline semiconductor light-emitting diode dies that are mounted on a flexible printed circuit or other substrate. In configurations in which it is not necessary to display images, regions of a pixel array or an entire array of light-emitting diodes 44 may be controlled in tandem (e.g., to turn all of the light-emitting diodes 44 on or off together, etc.), thereby obviating the need for complex display driver circuitry. In configurations where it is desired to control each pixel 44 individually, complex patterns of illumination may be generated.

Figure 11:
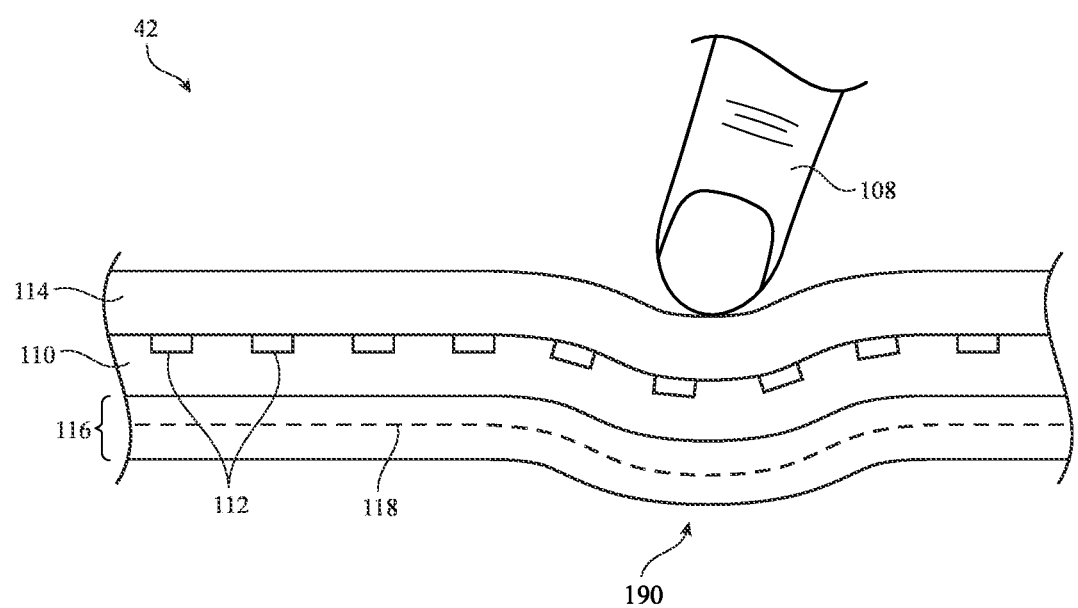
FIG. 11 is a cross-sectional side view of an illustrative lighting system with a force sensor layer in accordance with an embodiment.

As shown in FIG. 11, lighting system 42 may include force sensitive components such as force sensor 116. Force sensor 116 may include a flexible printed circuit layer, a fabric layer, or other layer that contains metal traces 118 or other conductive paths and structures for forming an array of force sensors (e.g., strain gauge sensors). Force sensor 116 may also be based on a capacitive force sensor configuration, a piezoelectric force sensor configuration, etc. Display layer 110 may have an array of organic light-emitting diodes pixels 112 or pixels formed from individual light-emitting diode dies. Covering layer 114 may be formed from fabric, plastic, leather, metal, fiber-composite material (e.g., carbon fiber), wood, or other material. Openings (see, e.g., openings 68 of FIG. 8) may be formed in layer 114 (e.g., in alignment with light-emitting diode pixels 112). When a user's finger 108 or other external object applies localized force to the layers of system 42, these layers may flex inwardly as shown in indented area 190 of FIG. 11. The strain gauge structures formed from traces 118 or other force sensor structures in region 190 can detect the applied force from finger 108 and can register a user finger press input (force input) in region 190. The finger press may serve as a button press or other input (e.g., a gesture input in situations in which finger 108 is swiped along the surface of layer 114).

As an example, system 42 of FIG. 11 may be included in seats 22. When a user desires to move a seat, the user may press finger 108 against the seat in the desired direction of seat movement. When control circuitry 36 detects the finger input, the control circuitry can direct a seat positioning motor in the seat to adjust the position of the back of the seat or other portion of seat. In this way, a user can move seats back and forth within system 10 to facilitate entry and exit through doors 16, to ensure that the user's position within system 10 is comfortable, or to otherwise move seats 22 or other movable portions of system 10.

The appearance of the exposed surface materials in the interior of system 10 such as illustrative layer 66 of FIG. 8 may be adjusted by controlling the patterns of light emitted by light-emitting diodes 44 under these materials. FIGS. 12, 13, 14, 15, 16, and 17 show illustrative patterns of light (illumination) that may be generated using light-emitting diodes 44 in lighting system 62. During operations in which light-emitting diodes 44 are off, layer 66 may have an unilluminated (natural) appearance of the type shown in FIG. 12. In this configuration, unilluminated region 120 covers layer 66 so that the normal texture and appearance of layer 66 is present and visible to the user. For example, if layer 66 is formed from a smooth plastic layer, layer 66 will appear smooth and solid. If layer 66 is formed from a coarsely woven fabric, layer 66 may have a distinctive fabric texture. Leather, metal, and other materials may likewise be characterized by corresponding distinctive appearances.

When a user desires to change the interior appearance of system 10 (e.g., to provide ambient lighting, to provide informative content such as an instructive symbol or text, and/or to provide a different appearance to layer 66 for aesthetic reasons), the user can supply input via input devices 38. Control circuitry 36 can adjust lighting system 42 (e.g., light-emitting diodes 44) autonomously or in response to user input. Control circuitry 36 may, for example, determine which light-emitting diodes 44 are illuminated and how strongly each light-emitting diode 44 or group of light-emitting diodes 44 is illuminated by generating control signals. The control signals may be generated in response to the user input, in response to other data gathered with input devices 38, and/or internal status information maintained by circuitry 36.

Figure 12:
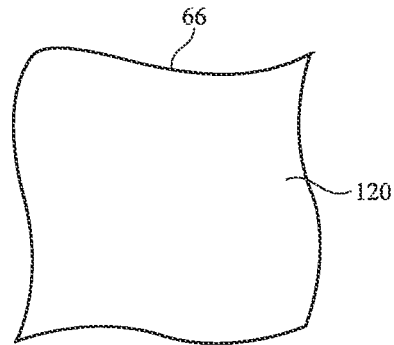
FIGS. 12, 13, 14, 15, 16, and 17 are diagrams showing illustrative patterns of illumination that may be produced with a lighting system in accordance with an embodiment.
Figure 13:
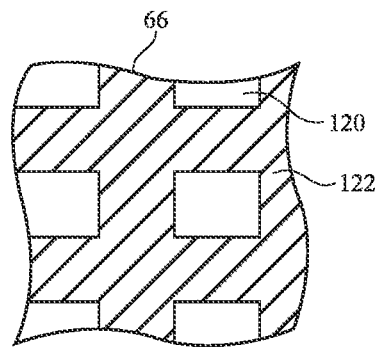

In the example of FIG. 12, unilluminated region 120 covers layer 66, so layer 66 has its normal unilluminated appearance (i.e., no backlighting from system 42 is present). In the example of FIG. 13, light-emitting diodes 44 have been turned on in a decorative pattern that creates an illuminated grid pattern (grid 122) and an array of unilluminated blocks (regions 120).

Figure 14:
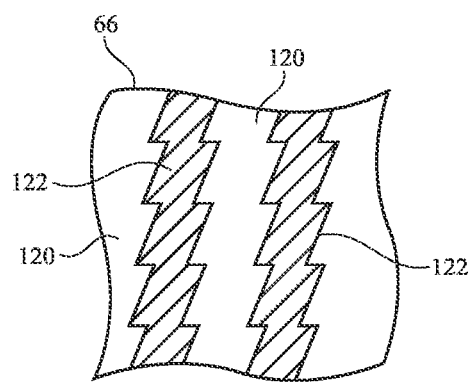

FIG. 14 shows how illuminated regions 122 may have the shapes of stripes interspersed with elongated strip-shaped unilluminated regions 120. The decorative patterns of FIGS. 13 and 14 are presented as examples. In general, system 42 may be used to create any desired illuminated pattern on layer 66.

Figure 15:
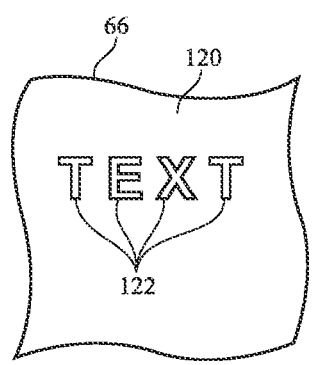
Figure 16:
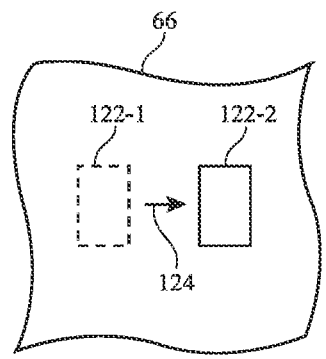

FIG. 15 shows how illuminated light-emitting diodes 44 may create illuminated text 122 on layer 66 that is surrounded by unilluminated area 120. Alphanumeric symbols and other symbols may be used to form speedometers and other gauges, may be used to provide a user with instructions, media playback information, etc.

If desired, the content that is displayed by light-emitting diodes 44 may be moving content (e.g., moving images such as video or graphic patterns with movement). This is shown by moving illuminated region 122-1, which is moving to position 122-2 in direction 124 in the example of FIG. 16.

Figure 17:
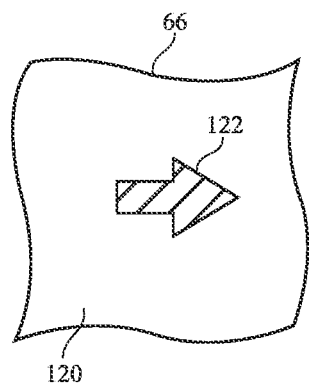

As shown in FIG. 17, illuminated content produced by light-emitting diodes 44 in lighting system 42 may have the shape of a turn indicator, an illuminated icon for providing a user with instructions, or other informative information.

Figure 18:
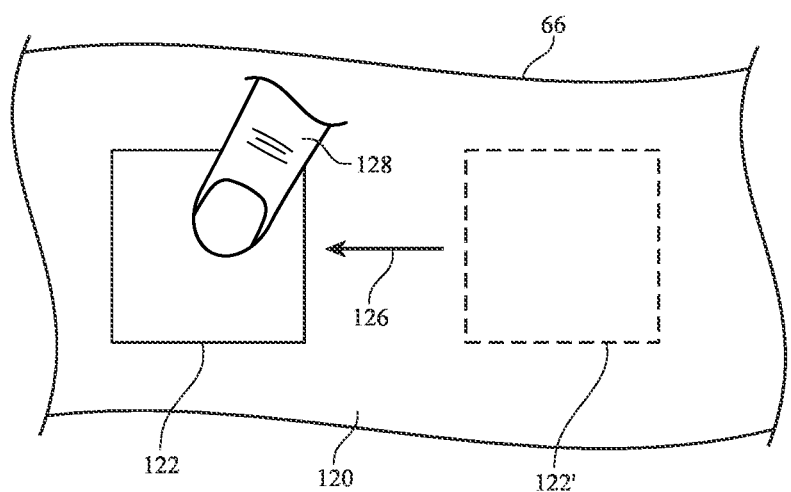
FIG. 18 is a diagram showing how a user may reposition light output regions produced by a lighting system using touch gestures supplied to a touch sensor in the lighting system in accordance with an embodiment.

In configurations in which a touch sensor such as touch sensor 90 of FIG. 8 underlies layer 66, a user's finger may be used to select and drag illuminated objects. This is illustrated in FIG. 18. In the example of FIG. 18, illumination is originally displayed in region 122' and is not displayed in region 120. Region 122' may be, for example, a speedometer gauge or a decorative pattern of static or moving light on a door panel or seat (e.g., a solid region, a stripped region, a flashing region, etc.). By touching region 122' with the user's finger and moving the finger across the surface of layer 66 in direction 126, control circuitry 36 may be directed to move the illuminated content of 122' to the position shown by illuminated region 122, thereby customizing the placement of illumination in the interior of system 10. Other types of commands may also be used to reorganize the location of illuminated regions 122 on surfaces such as the surface of layer 66 and to select the type of information displayed in these regions. As an example, a user may supply keyboard input, input from a paired wireless device, voice command input, force sensor input, or other input to control circuitry 36 using input devices 38. The user input may specify what type of content is to be displayed in each illuminated region 120 (e.g., a vehicle gauge such as speedometer, odometer, fuel gauge, etc.), a temperature gauge, humidity gauge, or other environmental sensor output, a navigation screen or other driving directions, information on media being played to the user via a media playback system in system 10, a uniform pattern of illumination that serves as ambient lighting, patterned lighting to create a desired texture on a door panel, dashboard surface, seating surface (e.g., plaid, patterns of the type shown in FIGS. 13 and 14, etc.), or other desired illumination. In addition to customizing the interior of system 10 by specifying the type of illuminated content to be presented, the user may supply user input (via touch, voice, keyboard, wireless command, etc.), to position the selected content where desired on any of the exposed surfaces with lighting systems 42 in the interior of system 10. Arrangements such as these may also be used to select and position custom content on the exterior of system 10.

If desired, user input may direct system 42 to change the appearance of most or all of the exposed surfaces of particular components in system 10 by virtue of adjusting the color, intensity, and/or pattern of illuminated light-emitting diodes 44. As an example, the entire fabric interior surface of system 10 or large areas of the interior of system 10 can be altered in color and texture. Appearance changes such as these may be made according to a predetermined schedule, based on ambient lighting conditions, vehicle speed, or other criteria, and/or based on user input.

Figure 19:
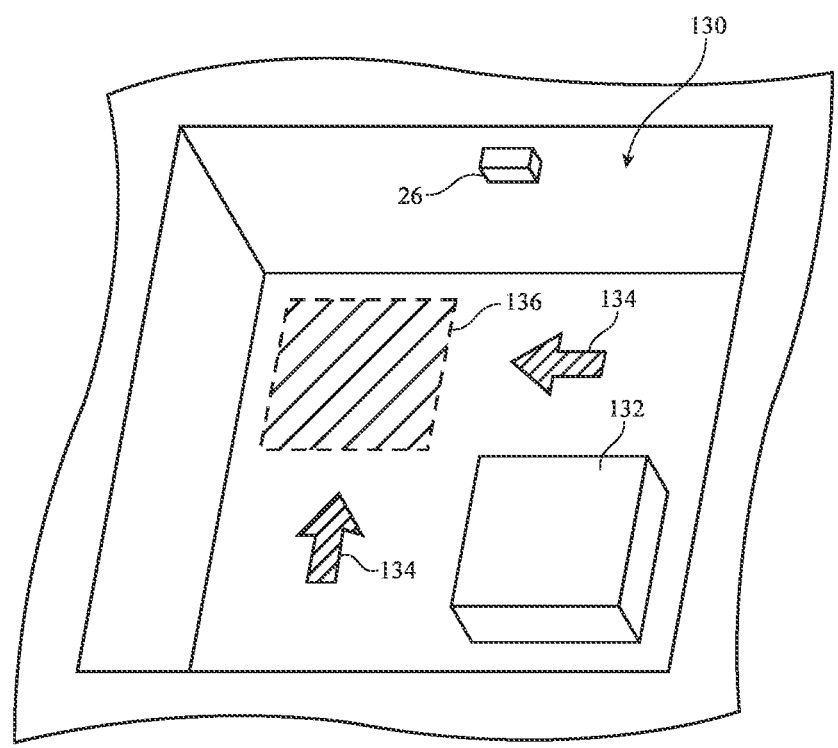
FIG. 19 is a perspective view of an illustrative compartment in which a camera and a lighting system are being used to provide a user with visual instructions on how to load an item into the compartment in accordance with an embodiment.

In the example of FIG. 19, system 10 has a trunk with a luggage compartment or other cavity (compartment 130). A user may desire to load luggage or other items such as illustrative item 132 into compartment 130. System 10 may be provided with sensors that gather information on the location of items such as item 132 during loading. For example, system 10 may have a camera such as camera 26 that determines the size, shape, orientation, and movement of item 132 in real time. In response, control circuitry 36 may compute a desired location at which to place item 132 (e.g., to maximize luggage packing density, to equalize loads, etc.). After computing a desired target location for item 132, control circuitry 36 may use a lighting system under the floor of compartment 130 (e.g., under the fabric or carpet lining compartment 130) to display helpful instructions to the user (e.g., instructions in the form of arrows 134 and target luggage location 136). The illuminated instructions may provide a user with visual assistance to simplify the process of loading compartment 130.

Figure 20:
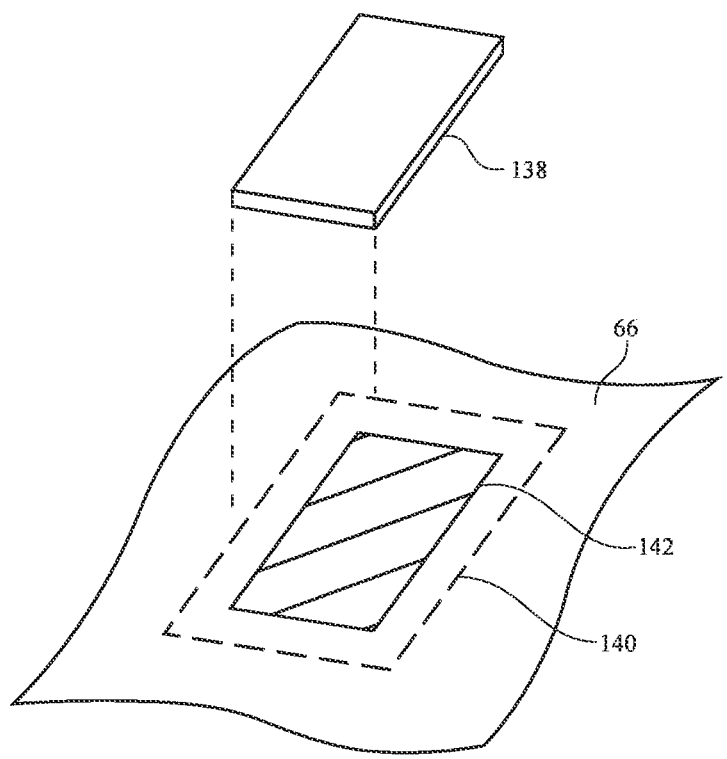
FIG. 20 is a perspective view of an illustrative illuminated wireless charging pad in accordance with an embodiment.

FIG. 20 is a perspective view of an illustrative wireless charging system for system 10. In the example of FIG. 20, a user has a cellular telephone, tablet computer or other portable device such as device 138. Device 138 has wireless charging circuitry that allows device 138 to receive transmitted wireless power (e.g., transmitted electromagnetic fields) from wireless charger 140. Wireless charger 140 may include inductive charging coils and/or other wireless charging circuitry under the surface of layer 66. When wireless charger 140 detects the presence of device 138 (e.g., using proximity sensor circuitry, by communicating with device 138 using near field communications circuitry, by making impedance measurements with wireless charger 140, etc.), lighting system 42 under layer 66 may illuminate instructions such as target electronic device location 142. When the user sees that area 142 is illuminated, the user can conclude that wireless charging is available and that device 138 should be placed in target location 142 for optimum charging. As with all illuminated regions produced by light-emitting diodes 44 in system 10, region 142 in the example of FIG. 20 may be patterned with a decorative pattern, may be solid, may include text, may include icons, may include moving content, etc. (see, e.g., FIGS. 12, 13, 14, 15, 16, and 17).

Figure 21:
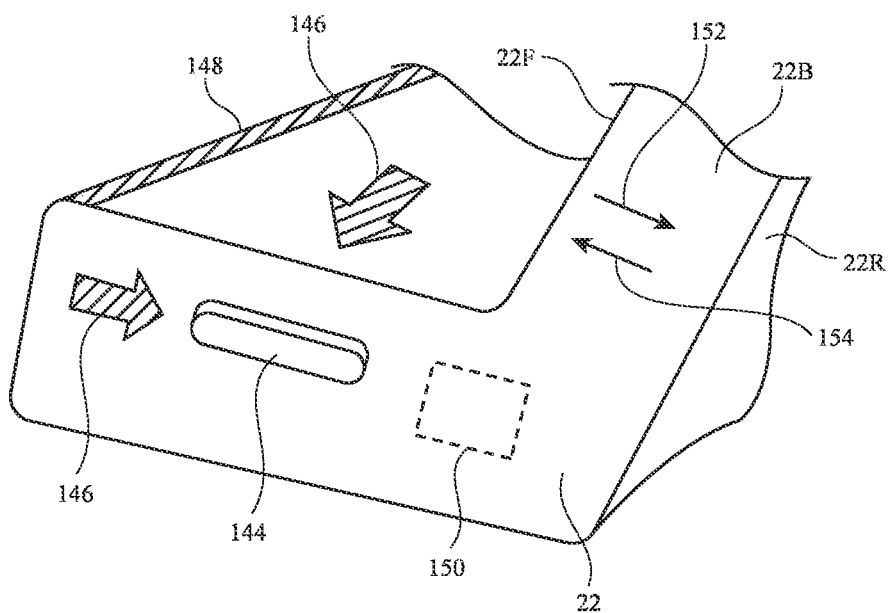
FIG. 21 is a perspective view of an illustrative input device such as a lever and associated visual guidance that is being provided using a lighting system in accordance with an embodiment.

As shown in the example of FIG. 21, seat 22 may have levers, buttons, or other control devices such as control device 144. Lighting systems 42 may use light-emitting diodes 44 to create arrow symbols 146 or other information that may help a user locate and properly use control device 144. Lighting systems 42 may also display user-selected decorative patterns or other decorative patterns on the surfaces of seat 22, as described in connection with FIGS. 12, 13, 14, 15, 16, and 17. If desired, piping or other trim (e.g., trim 148 of FIG. 21) may be provided with light from a lighting system. For example, an elongated light guide such as light guide 50 of lighting system 42 of FIG. 4 may be embedded within cylindrical piping such as piping 23 of FIG. 4 (e.g., perforated leather, plastic, fabric, etc.) that serves a trim for seat 22 or a strip of the surface layer of seat 22 may be illuminated using a strip of underlying light-emitting diodes 44 or other lighting system structures to provide illuminated trim features. Seat 22 may have a seat back such as seat back 22B. Front surface 22F and/or rear surface 22R of seat back 22B may be provided with a lighting system such as lighting system 42 of FIG. 11 that has an embedded force sensor (force sensor 116) or that has an embedded touch sensor (see, e.g., touch sensor 90 of FIG. 8), embedded pressure (force) sensor such as sensor 31 of FIG. 1 (e.g., a piezoelectric sensor, switch, or other sensor that responds to applied pressure from a user's fingers, etc.), or other embedded sensor that can detect user input. Seat 22 may also include motor system (motor) 150 for adjusting the position of seat 22, the position of seatback 22B, and other attributes of seat 22. When user desires to adjust an attribute of seat 22, the user may press on an appropriate surface of seat 22 to activate the sensor in that portion of seat 22. In response, control circuitry 36 will use motor system 150 to reconfigure seat 22. As an example, a user may press on front surface 22F of seatback 22B. In response, control circuitry 36 will move seatback 22B in rearward direction 152. As another example, a user may press on rear surface 22R of seatback 22B. In response to detecting sensor input from a sensor associated with rear surface 22R, control circuitry 36 may direct motor 150 to move seatback 22B in forward direction 154. The portion of seat 22 that is pressed by the user's finger or other portions of seat 22 may be illuminated (e.g., with a symbol, etc.) to provide visual feedback during seat repositioning operations.

Figure 22:
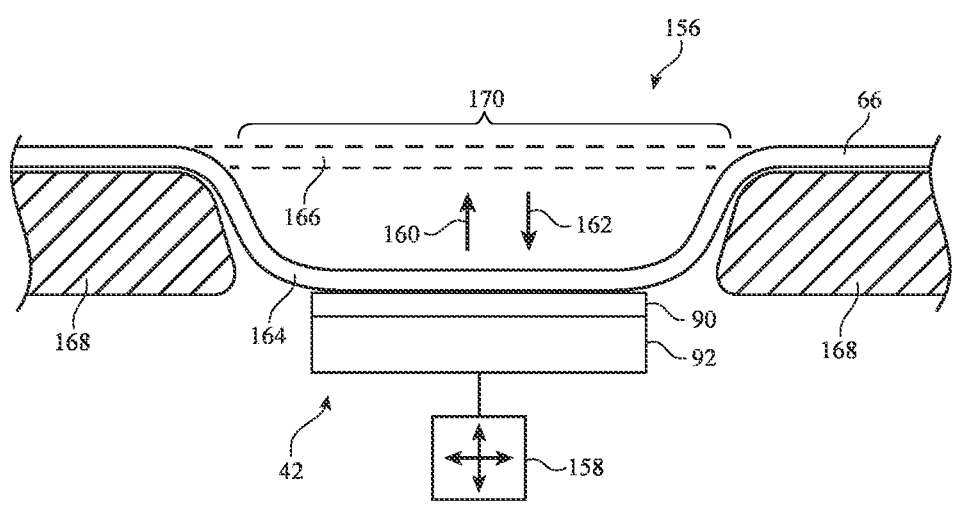
FIG. 22 is a cross-sectional side view of an adjustable-depth receptacle with a lighting system in accordance with an embodiment.

System 10 may have reconfigurable storage areas such as adjustable storage compartment 156 of FIG. 22. In the illustrative configuration of FIG. 22, storage compartment 156 is formed from an area of support structure 168 that contains an opening such as opening 170. Covering layer 66 (e.g., fabric, leather, plastic, etc.) may be flexible and may overlap support structure 168 and opening 170. Motor 158 may be controlled by control circuitry 36 and may be used to raise and lower layer 66 in opening 170. Lighting system 42 may be located below the portion of layer 66 in opening 170. Sensor 90 may be interposed between an array of light-emitting diodes or other light-emitting structures in a lighting layer such as display layer 92 and overlapping portions of cover layer 66.

When it is desired to configure compartment 156 to receive items (cellular telephone, keys, etc.) from a user for storage, motor 158 may move the portion of layer 66 within opening 170 and lighting system 42 in downward direction 162 to position 164. When it is desired to create a smooth recess-free surface for layer 66, motor 158 may be directed to move lighting system 42 and layer 66 in opening 170 in direction 160 to position 166. Lighting system 42 may include one or more light-emitting diodes 44 or other light sources for creating illumination that passes through openings in layer 66 (e.g., illumination for creating images, illumination for creating ambient lighting, illumination for creating aesthetically appealing trim patterns and other decorative patterns, illumination for creating instructive icons and other content for a user, etc.). Compartments such as adjustable compartment 156 of FIG. 22 may be located between arm rests, in a console area adjacent to dashboard 20, or elsewhere in system 10.

Figure 23:
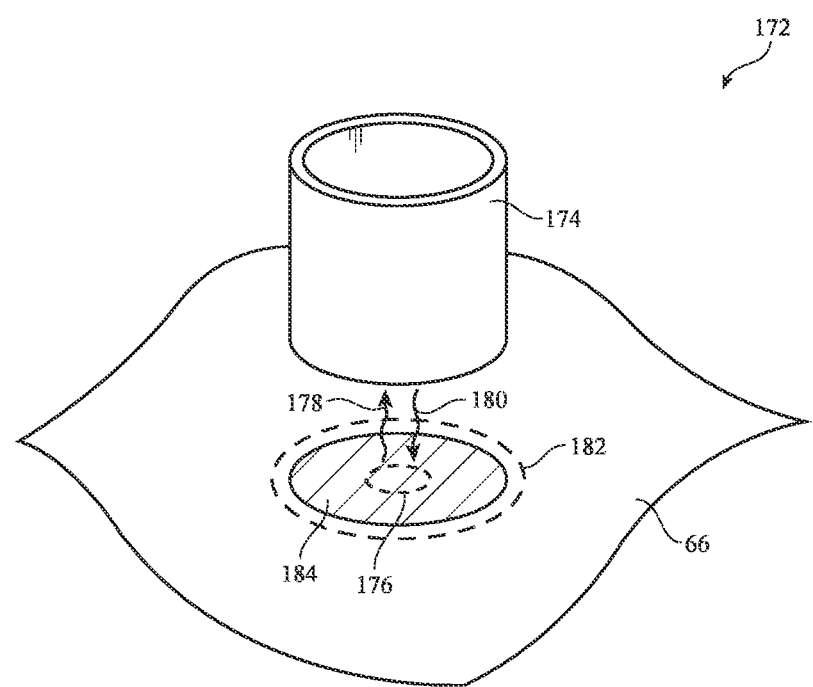
FIG. 23 is a perspective view of an illustrative magnetic holder for an item such as a cup and an associated lighting system in accordance with an embodiment.

If desired, system 10 may have a system that detects cups and other objects using sensors and that provides visual feedback and other functions in response. Consider, as an example, magnetic cup attachment system 172 of FIG. 23. As shown in FIG. 172, a user may desire to place a cup such as cup 174 on the surface of cover layer 66. Lighting system 42 and electromagnets may be placed in area 182 under cover layer 66. Proximity sensor 176 may detect when cup 174 is in the vicinity of area 182 (e.g., within 10 cm of area 182 or other suitable threshold distance). Proximity sensor 176 may use capacitance measurements, magnetic measurements, or other suitable proximity sensor measurements. As an example, sensor 176 may emit infrared light 178 and may measure reflected infrared light 180. When the amount of reflected infrared light 180 is sufficiently high, control circuitry 36 may conclude that cup 174 is within range of area 182 and can activate visual feedback by illuminating area 184 with the lighting system. Control circuitry 36 may also activate the electromagnet of region 182 to electromagnetically attract cup 174 to region 182. Cup 174 may include a layer of iron, a magnetic layer, or other magnetically attracted structures to help hold cup 174 in place when the electromagnet of area 182 has been activated. If desired, a permanent magnet may be used in area 182 in place of an electromagnet.

Figure 24:
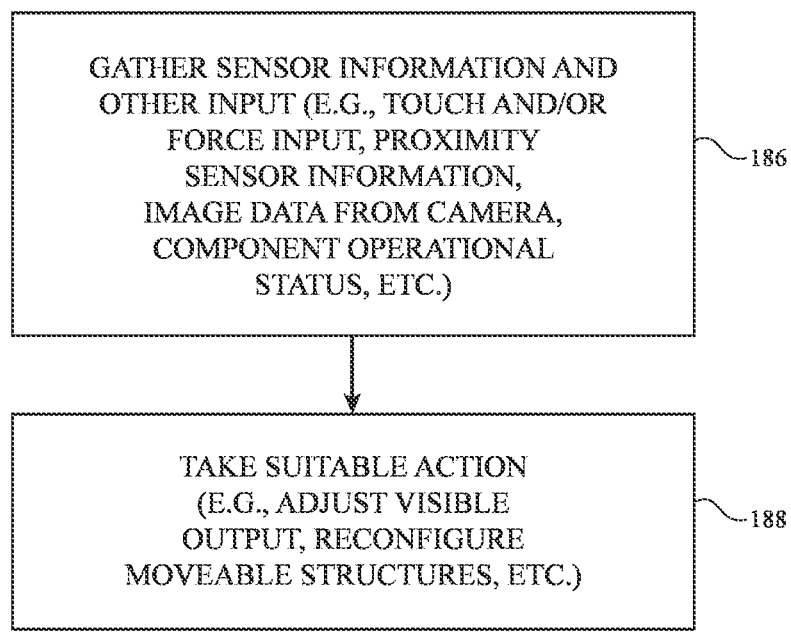
FIG. 24 is a flow chart of illustrative operations involved in using a lighting system in accordance with an embodiment.

A flow chart of illustrative steps involved in operating system 10 are shown in the flow chart of FIG. 24.

At step 186, control circuitry 36 may process data in system 10 to determine which actions to take with respect to lighting systems 42, motors, and other output devices 40. The data that is processed may include sensor data and data from other input devices 38. Control circuitry 36 may gather sensor data from environmental sensors, may gather data from wireless sources (e.g., road beacons, wireless devices), may gather user input such as voice commands, touch gestures, force input, button input, etc., may gather information on the current time and date and other status information from clock circuitry and other circuitry in control circuitry 36, and may gather other data for processing. Data processing operations may be performed periodically (e.g., according to a schedule), may be performed continuously (e.g., using code that runs as a continuous background process on control circuitry 36), may be performed in response to receipt of user input, etc.

Based on the data processing operations of step 186, control circuitry 36 may adjust lighting systems 42, may adjust motors, may adjust other output devices 40, or may take other suitable actions (step 188). Control circuitry 36 may, for example, generate visible content such as moving images, ambient lighting, informative content such as arrow icons, text instructions, warnings (e.g., window trim that is illuminated to indicate when windows are closing), and other illuminated information, and/or may generate decorative patterns of light that are aesthetically appealing (e.g., appealing textures, colors, trim patterns, etc.).

Control circuitry 36 may also send messages to users, may generate audible alerts and other audible output, and/or may produce other output in response to the data processed during the operations of step 186. Examples of actions that may be taken by control circuitry 36 at step 188 include moving a portion of seat 22 or all of seat 22, adjusting a compartment, providing illuminated instructions for loading a storage area, supplying a user who desires to place a cup on a cup holder area with illuminated information, supplying illuminated information for a user of a wireless charging area so that a user may accurately orient an electronic device in the wireless charging area, supplying illumination on door panels 18, seats 22, dashboard 20, seatbelt 32, and/or other interior surfaces of system 10 (e.g., illumination for ambient lighting, vehicle gauges and other informative displays, illumination for adjusting trim patterns, textures, and other decorative illumination related to system aesthetics), supplying illumination to inform a user of driving conditions, presenting illumination to inform a user about objects outside of system 10 (e.g., nearby vehicles, road obstructions, parking obstacles, pedestrians, etc.), information on currently playing media (radio station identification information, song title and artist, track number, volume, etc.), presenting illuminated warnings, and/or other types of illumination to inform and entertain a user.

Illuminated regions may be placed in custom locations by a user (e.g., by allowing a user to drag and drop illuminated areas using touch sensors in lighting system 42, using other user input, etc.). As an example, a user may use a touch sensor to drag a media playback information region from one part of a dashboard surface to another part of the dashboard surface. The dashboard surface may be covered with an aesthetically appealing surface (leather, plastic, fabric, metal, wood, etc.) and need not have the appearance of a traditional display, because lighting system 42 may present images and other light-based output through a covering layer on the dashboard. As another example, a user may select which portions of a seat are to be illuminated to serve as trim (i.e., the user may customize trim areas of the seat). The user may also make adjustments to a lighting system in a seat to change the appearance of a fabric, leather, or other covering on the seat (e.g., to change the pattern on the seat between selectable decorative patterns such as plaid, striped, dotted, solid, etc.). Changes such as these may be made in response to user input and/or may be made autonomously and may be made to areas on door panels, headrests, headliner, carpet in footwells, and other interior surfaces of system 10. The foregoing examples are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A vehicle, comprising:
a body;
a layer of fabric on the body;
an illumination system that illuminates the layer of fabric in a first mode of operation and that is hidden from view in a second mode of operation; and
control circuitry that controls the illumination system based on at least one of: ambient lighting conditions, vehicle speed, and user input.

2. The vehicle defined in claim 1 wherein the layer of fabric comprises openings through which light from the illumination system passes.

3. The vehicle defined in claim 2 wherein the openings comprise microperforations.

4. The vehicle defined in claim 2 wherein the openings are patterned to form at least one of: text, an icon, and a symbol.

5. The vehicle defined in claim 1 wherein the illumination system comprises a light-emitting diode that emits light and a light guide layer that guides the light via total internal reflection and wherein the light guide layer has a light extraction region that scatters the light out of the light guide layer and through the layer of fabric.

6. The vehicle defined in claim 1 wherein the illumination system comprises an array of display pixels.

7. The vehicle defined in claim 1 further comprising a sensor that overlaps the layer of fabric and that detects the user input on the layer of fabric.

8. The vehicle defined in claim 7 wherein the layer of fabric comprises conductive strands and wherein the sensor comprises a capacitive touch sensor that is formed from the conductive strands.

9. The vehicle defined in claim 7 wherein the control circuitry switches the illumination system between the first and second modes based on the user input on the layer of fabric.

10. The vehicle defined in claim 1 wherein the illumination system comprises light-emitting diodes that are aligned with openings in the layer of fabric.

11. A vehicle, comprising:
a body;
a covering structure on the body;
a sensor configured to gather user input on the covering structure;
an illumination system configured to provide illumination through the covering structure, wherein the illumination provides ambient lighting in a first mode of operation and informational lighting in a second mode of operation; and
control circuitry configured to adjust the illumination based on the user input.

12. The vehicle defined in claim 11 wherein the sensor is selected from the group consisting of: a capacitive touch sensor, a force sensor, and a proximity sensor.

13. The vehicle defined in claim 11 wherein the covering structure comprises fabric with openings through which the illumination passes.

14. The vehicle defined in claim 11 wherein the information lighting comprises at least one of: a speedometer gauge, a fuel gauge, and a temperature gauge.

15. The vehicle defined in claim 11 wherein the illumination system comprises a light-emitting diode that emits light and a light guide that guides the light via total internal reflection.

16. A vehicle, comprising:
a body;
a covering layer on the body;
an illumination system that provides illumination through the covering layer;
a sensor overlapping the covering layer and configured to detect user input on the covering layer; and
control circuitry configured to shift a location of the illumination from a first portion of the covering layer to a second portion of the covering layer in response to the user input.

17. The vehicle defined in claim 16 wherein the sensor comprises a touch sensor and wherein the user input comprises a finger drag across the covering layer.

18. The vehicle defined in claim 16 wherein the covering layer comprises fabric having openings through which the illumination passes.

19. The vehicle defined in claim 16 wherein the illumination is selected from the group consisting of: ambient illumination, informational lighting, and decorative trim lighting.

20. The vehicle defined in claim 16 wherein the illumination is configured to display at least one of: a speedometer gauge, a fuel gauge, and a temperature gauge.

* * * * *